(12) United States Patent  
Cundin et al.

(10) Patent No.: US 11,415,456 B2  
(45) Date of Patent: Aug. 16, 2022

(54) ELECTROMAGNETIC DOSIMETER

(71) Applicant: THE BOARD OF REGENTS OF THE UNIVERSITY OF TEXAS SYSTEM, Austin, TX (US)

(72) Inventors: Luisiana Cundin, Westwego, LA (US); Norman Barsalou, San Antonio, TX (US); Shannon Voss, San Antonio, TX (US); Saher Maswadi, San Antonio, TX (US); Randolph D Glickman, San Antonio, TX (US)

(73) Assignee: The Board of Regents of The University of Texas System, Austin, TX (US)

( * ) Notice: Subject to any disclaimer, the term of this patent is extended or adjusted under 35 U.S.C. 154(b) by 354 days.

(21) Appl. No.: 15/760,274

(22) PCT Filed: Sep. 15, 2016

(86) PCT No.: PCT/US2016/051829  
§ 371 (c)(1),  
(2) Date: Mar. 15, 2018

(87) PCT Pub. No.: WO2017/048893  
PCT Pub. Date: Mar. 23, 2017

(65) Prior Publication Data  
US 2018/0283934 A1   Oct. 4, 2018

Related U.S. Application Data

(60) Provisional application No. 62/218,660, filed on Sep. 15, 2015.

(51) Int. Cl.  
*G01N 29/07* (2006.01)  
*G01N 29/024* (2006.01)  
(Continued)

(52) U.S. Cl.  
CPC .............. *G01H 5/00* (2013.01); *G01H 9/00* (2013.01); *G01N 29/024* (2013.01);  
(Continued)

(58) Field of Classification Search  
CPC .......... G01H 5/00; G01H 9/00; G01N 29/024; G01N 29/036; G01N 29/07; G01N 29/12; G01N 29/2418; G01N 2291/011  
(Continued)

(56) References Cited

U.S. PATENT DOCUMENTS 3,474,253 A * 10/1969 Kessler ................... G01H 9/00  
    250/216  
4,452,071 A *  6/1984 Eesley .................... G01L 11/04  
    356/520

(Continued)

OTHER PUBLICATIONS

International Search Report and Written Opinion issued in Application No. PCT/US2016/051829, dated Dec. 1, 2016.  
(Continued)

*Primary Examiner* — Lisa M Caputo  
*Assistant Examiner* — Rose M Miller

(57) ABSTRACT

Certain embodiments are directed to an acoustograph or acoustic sensor configured as a thermometer or direct specific absorption rate (DSAR) sensor for the measurement of electromagnetic energy.

2 Claims, 1 Drawing Sheet

(51) Int. Cl.
*G01H 5/00* (2006.01)
*G01H 9/00* (2006.01)
*G01N 29/24* (2006.01)
*G01N 29/036* (2006.01)
*G01N 29/12* (2006.01)

(52) U.S. Cl.
CPC ........... *G01N 29/036* (2013.01); *G01N 29/07* (2013.01); *G01N 29/12* (2013.01); *G01N 29/2418* (2013.01); *G01N 2291/011* (2013.01)

(58) Field of Classification Search
USPC .......................................................... 73/579
See application file for complete search history.

(56) References Cited

U.S. PATENT DOCUMENTS

| | | | | |
|---|---|---|---|---|
| 4,655,608 | A * | 4/1987 | Goss ...................... | G01K 11/24 |
| | | | | 374/117 |
| 5,748,318 | A * | 5/1998 | Maris ................. | G01N 21/1702 |
| | | | | 356/630 |
| 6,590,661 | B1 * | 7/2003 | Shnier ...................... | G01H 9/00 |
| | | | | 356/432 |
| 2008/0315131 | A1 | 12/2008 | Devos et al. | |
| 2012/0002193 | A1 | 1/2012 | Elliot et al. | |

OTHER PUBLICATIONS

International Preliminary Report on Patentability issued in Application No. PCT/US2016/051829, dated Mar. 20, 2018.

\* cited by examiner

ELECTROMAGNETIC DOSIMETER

This application is a national phase application under 35 U.S.C. § 371 of International Application No. PCT/US2016/051829 filed Sep. 15, 2016 which claims priority to U.S. Provisional Patent Application Ser. No. 62/218,660 filed Sep. 15, 2015, each of which is incorporated herein by reference in its entirety.

BACKGROUND

Methods of sensing the deposition of electromagnetic (EM) energy rely on a number of phenomena. For example, photoconductive detectors become electrically conductive with deposition or absorption of electromagnetic energy. These detectors are typically semiconductors. In photoconductive detectors, absorption by valance band electrons of electromagnetic radiation with energy higher than the band gap energy causes the electrons to jump to the conduction band. This phenomenon creates free electrons in the conduction band, electron holes in the valence band, and electrical conductivity.

Photovoltaic detectors produce electric voltage when struck with electromagnetic radiation. Photovoltaic detectors also use semiconductors, but rely on the use of two semiconducting materials that are kept in contact but have different conductivity properties. Upon absorption of electromagnetic radiation of suitable energy, electrons can jump to the conduction band, but the movement of the electrons in the conductive band are influenced by the different conductivity properties of the two different semiconducting materials. The free electrons move more freely in the higher conducting semiconducting material, thus the free electrons move favorably across the junction between two different semiconducting materials into the higher conducting semiconducting material, creating electrical voltage. The voltage created is related to the amount of incident electromagnetic energy absorbed.

As a further example, photoemissive detectors operate based on photoelectric effect. Photoemissive detectors are typically a metal. These detectors emit electrons when light of a frequency greater than certain threshold frequency is absorbed. The threshold frequency depends on the properties of the detector.

As an additional example, thermal detectors produce temperature change with electromagnetic energy deposition. However, most of these detectors have limitations like long response time, low resolution, insufficient sensitivity, limited useable wavelengths or frequency ranges, inability to deliver real-time data, and long cooling or wait time.

Each of the previous methods of sensing the deposition of electromagnetic energy have their limitations. Thus, there remains a need for more efficient methods for measurement of deposition of electromagnetic energy.

SUMMARY

The present invention provides additional methods and apparatus for the measurement of electromagnetic energy deposition. Certain embodiments are directed to an acoustograph or acoustic sensor configured as a thermometer (or direct specific absorption rate (DSAR) sensor) for the measurement of electromagnetic energy deposition in a target medium. The acoustograph uses the probe beam deflection technique configured as a chronograph to measure the speed of an acoustic wave generated in the target medium. The acoustic wave may be mechanically or optically induced in the target medium. In certain aspects the acoustograph can be used to measure electromagnetic radiation deposited in biological tissue, or non-biological objects or locations, as an EM sensor, EM transducer, or a converter depending upon the configuration of the sensor and/or the target medium used.

The target medium is capable of transducing acoustic waves and allows traversal of probe beams. The target medium may be any material where the speed of the acoustic waves traveling through the medium changes appropriately with electromagnetic energy deposition. At least one physical property of the target medium, such as temperature, changes with electromagnetic energy deposition. As the at least one physical property changes, the acoustic wave speed also changes. In certain aspects the target medium includes but is not limited to water (including various aqueous solutions such as salt solutions and the like), alcohol, glass, plastic, acoustic gel, or any other acoustic transmitting medium that is transparent or semi-transparent to the probe beam so that a detectable amount of probe beam is transmitted to the detector. Target medium can include various liquids, gases, and solids. Examples of such target mediums include, but are not limited to acetic acid, acetone, alcohols (e.g., butanol, ethanol, propyl alcohol, methanol and the like), benzene, carbon disulfide, carbon tetrachloride, castor oil, chloroform, ether, ethylene glycol, glycerol (glycerine), heptanes, hexane, kerosene, mercury, octane, phenol, toluene, turpentine, water (including various aqueous solutions such as salt solutions and the like), plastics, diamond, glass, pyrex, lucite, etc. In certain aspects, characteristics of the target medium can be controlled or modulated by temperature, e.g. a target medium may have a different acoustic speed at 0° C. that at 35° C. In certain aspects, the target medium can be or is thermally coupled to a biological tissue or be part of a an EM sensor, EM transducer, or a converter.

In certain embodiments, probe beam diameter is at least, about, or at most 5, 10, 20, 30, 40, 50, to 20, 30, 40, 50, 60, 70, 80, or 90 µm, or more, including all values and ranges there between. Certain embodiments include a single probe beam. In some embodiments, acoustic wave speed may be measured from the distance traveled by a wave in the time between the initial detection of the acoustic wave by the probe beam and a second detection of the acoustic wave by the same or a different probe beam after it is reflected or traverses the distance between two probe beams. In embodiments where at least two probe beams are utilized, acoustic wave speed is measured by measuring time required by an acoustic wave to travel the distance between the beams. In certain aspects, the probe beams can be spaced at 200, 300, 400, 500, 600, 700, 800, 900, 1000, 2000, 3000, 4000, or 5000 µm, or more including all values and ranges there between. In further aspects, the probe beams can be spaced at 1, 2, 3, 4, 5, 6, 7, 8, 9, or 10 mm, or more including all values and ranges there between. In some aspects, the probe beams can be spaced at 1, 2, 3, 4, 5, 6, 7, 8, 9, or 10 cm, or more including all values and ranges there between.

The resolution for the measurement of electromagnetic energy deposition can be influenced by time resolution. Smaller changes in acoustic speed can be measured with higher time resolution. The basic formula of time resolution is:

$$\Delta t = \text{beam waist/speed of sound in the medium}$$

Where beam waist is a beam's most narrow radius and in some instances the probe beam waist is at the probe beam spot on the detector.

In certain aspects, the acoustic speed of the medium where the beam propagates through can be modified to enhance resolution. As an example, using a 50 µm focused probe beam (beam waist) in water with a speed of sound of 1500 m/s (speed of sound in the medium), the time resolution ($\Delta t$) will be 33 ns. In another example using Glycerol (glycerine) as the target medium with the same 50 µm focused probe beam but a speed of sound of 1900 m/s, the time resolution will be 26 ns. In certain aspects, the target medium will have a homogenous acoustic speed throughout the medium. In other aspects the target medium has variable acoustic speeds through the medium, e.g., an increasing or decreasing acoustic speed gradient. The target medium can have an acoustic speed including 900, 100, 1100, 1200, 1300, 1400, 1500, 1600, 1700, 1800, 1900, 2000, 2100, 5000, 10000, 15000, or 20000 m/s, or more, including all values and ranges there between and can include combinations and gradients of materials having variable acoustic speeds.

In certain aspects, the resolution for the measurement of electromagnetic energy deposition can be enhanced by smaller spot size of the probe beam, which may decrease the beam waist. One method of decreasing the spot size of the probe beam is to use shorter wavelengths for the probe beam. For example, using a blue ray light can provide a smaller focus spot size than a red ray light.

Certain embodiments include a device for measurement of electromagnetic energy deposition comprising: (a) a target medium in which acoustic waves can be generated; (b) a probe beam source that can generate probe beams that travel through the target medium; and (c) a probe beam detector configured to detect deflection of the probe beam by an acoustic wave as the acoustic wave travels through the target medium. In certain aspects, the probe beam is an optical probe beam. In certain aspects, a pump beam source is used to generate a pump beam that can generate the acoustic waves in the target medium. In certain aspects, the target medium is water. In certain further aspects, there is one probe beam. In certain other aspects, there are at least two probe beams. In certain aspects, the optical probe has a diameter of 5 to 100 µm. In a further aspect, the probe beam has a diameter less than the characteristic ultrasound wavelength. The focus diameter of the optical probe beam may be limited by the diffraction limit, but can be as small as possible given such a limit. Furthermore, a probe beam source can generate one or more optical probe beams. In a further aspect the detector can comprise one or more probe beam detectors.

In some aspects, the probe beam detector is configured to detect probe beam deflection in two dimensions. In some instances, the detector can determine acoustic wave speed, pressure amplitude of the acoustic wave, the distance of the acoustic source, and/or direction of the acoustic wave. In certain aspects, the detector is a photodiode. In other aspects, the detector is a quadrant detector. In certain aspects, the acoustic detector has a frequency response between 1, 10, 50, or 100 Hz to 1, 20, 60, 80, or 100 MHz, including all values and ranges there between. In some aspects, the acoustic detector can be at least, at most, or about 50, 100, 200, to 300, 400 or 500 µm, including all values and range there between, in diameter or larger.

In some aspects, disclosed herein is a method for measuring the acoustic wave speed in a target medium comprising: (a) generating acoustic waves in a target medium; (b) exposing the target medium to an electromagnetic energy or a coupling the target medium to an absorber of electromagnetic energy; and (c) detecting alteration of the acoustic wave speed due to physical changes in the target medium due to electromagnetic energy deposition or absorption in the target medium or the EM absorber by probe beam deflection. In certain aspects the electromagnetic energy source can be from any source that emits EM that can be absorbed by the detector, e.g., the target medium itself or a second EM absorbing medium coupled to the target medium. In certain aspects the second medium is thermally coupled to the target medium. In certain aspects, the acoustic wave can be generated by an excitation source such as a light beam or any other energy source that can generate acoustic waves in the target medium.

In certain embodiments the change of acoustic wave speed in target medium due to electromagnetic energy deposition is determined based on the difference in time between the expected or measured time it would take an acoustic wave to travel a distance in a medium without electromagnetic energy deposition and the time it takes an acoustic wave to travel the same distance in a medium exposed to electromagnetic energy. In certain aspects a change in the speed of an acoustic wave as EM is absorbed is measured using probe beam deflection.

In certain embodiments the deflection of the probe beam is measured by a beam detector. Non-limiting examples of beam detectors include photoconductive detectors, photovoltaic detectors, photoemissive detectors, and thermal detectors.

In certain embodiments, the deflection of the probe beam is measured by the loss of detection of the probe beam on an area of the beam detector that detects the probe beam when the probe beam is not disturbed. In other embodiments, the deflection is measured by detecting the probe beam on an area of the beam detector that does not detect the probe beam when the probe beam is not disturbed.

In certain embodiments, the electromagnetic energy deposition and/or the temperature of a target medium is determined by comparing the measured speed or change of speed of an acoustic wave in the target medium with the speed or change of speed of an acoustic wave in the same or similar medium that is exposed or coupled to an absorption medium for electromagnetic energy. In certain aspects the absorption of EM results in a change in temperature of the target medium directly or indirectly. In some embodiments, a reference speed and/or change of speed in the same or similar medium is from a standard, a measurement in the same or similar medium, and/or is calculated based on the properties of the same and/or similar medium. In some embodiments, the electromagnetic energy deposition and/or the temperature of an target medium is further determined by exposing the target medium or a second medium thermally coupled to the target medium to an electromagnetic source and detecting probe beam deflections after, before, or both before and after exposure to the electromagnetic source and calculating speed of the acoustic wave using information provided by detection of at least one probe beam deflection after and/or both before and after exposure to the electromagnetic source. In certain aspects the speed of the acoustic waves is monitored over time to detect EM radiation impinging upon a detector by detecting changes in the acoustic wave travel time or speed.

In certain embodiments, detection or measurement of electromagnetic energy is by comparing the measured speed and/or change of speed of an acoustic wave in the target medium before, during, or after (or any combination thereof) exposure to electromagnetic energy as compared to a reference. In some embodiments, reference is a known or standard value for acoustic wave speed in the same or similar medium, a comparative measurement of acoustic wave speed in the same or similar medium, or is calculated based on the properties of the same or similar medium. In some embodiments, the electromagnetic energy is further determined by measuring the speed of an acoustic wave at two or more time points and calculating speed of the acoustic wave using information provided by detection of at least one probe beam deflection before and after exposure to the electromagnetic radiation.

In certain embodiments, the acoustic speed versus temperature of a medium can be determined, thus the temperature at any given time can be determined by measuring the acoustic speed in the medium. Also, the absorption characteristics of the absorbing medium can be determined using know amounts of EM exposure for known periods of time and correlating temperature change with amount of energy absorbed, thus one can correlate the temperature with energy absorbed by an absorbing medium, be it the target medium or a second medium thermally coupled to the target medium.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to all aspects of the invention. It is contemplated that any embodiment discussed herein can be implemented with respect to any method or composition of the invention, and vice versa. Furthermore, compositions and kits of the invention can be used to achieve methods of the invention.

The use of the word "a" or "an" when used in conjunction with the term "comprising" in the claims and/or the specification may mean "one," but it is also consistent with the meaning of "one or more," "at least one," and "one or more than one."

Throughout this application, the term "about" is used to indicate that a value includes the standard deviation of error for the device or method being employed to determine the value.

The use of the term "or" in the claims is used to mean "and/or" unless explicitly indicated to refer to alternatives only or the alternatives are mutually exclusive, although the disclosure supports a definition that refers to only alternatives and "and/or."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DESCRIPTION OF THE DRAWINGS

The following drawings form part of the present specification and are included to further demonstrate certain aspects of the present invention. The invention may be better understood by reference to one or more of these drawings in combination with the detailed description of the specification embodiments presented herein.

DESCRIPTION

Figure 1:
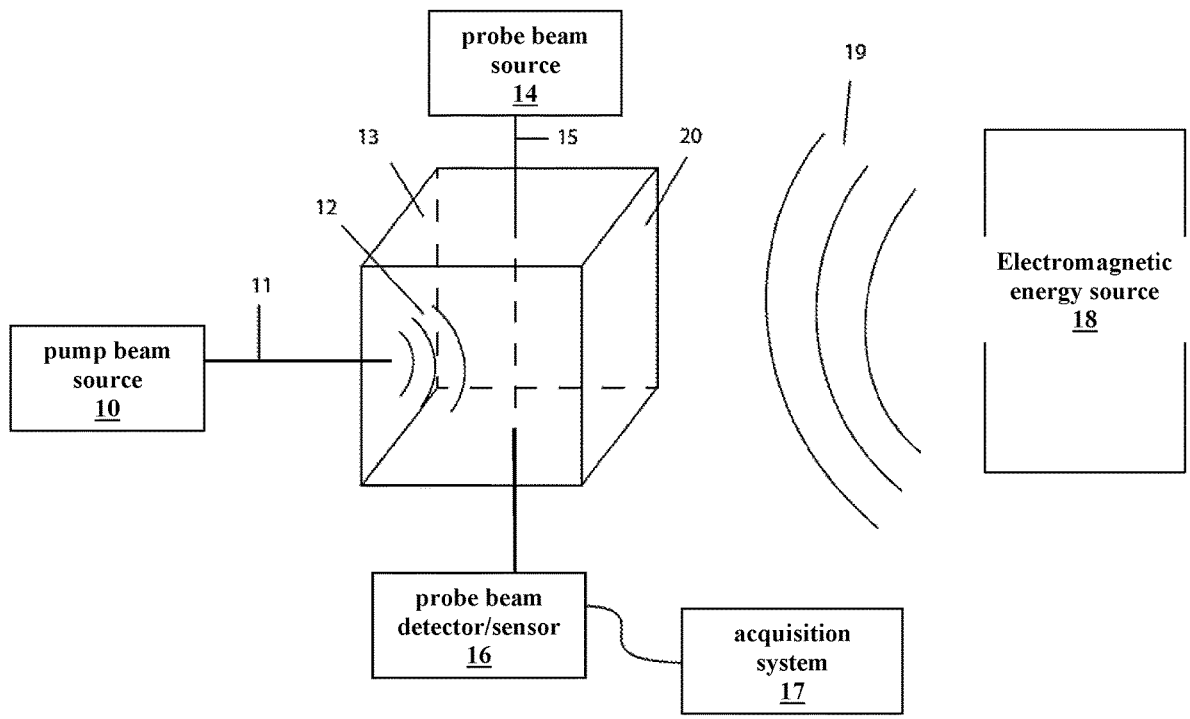
FIG. 1. An example of an acoustograph or acoustic sensor configured as a thermometer or direct specific absorption rate (DSAR) sensor for the measurement of electromagnetic energy.

FIG. 1 shows a target medium (13), a probe beam (15), a pump beam (11), an acoustic wave (12), an electromagnetic energy wave (19), an electromagnetic energy source (18), a probe beam source (14), a probe beam detector/sensor (16), an acquisition system (including a timer) (17) for collecting and analyzing data, a pump beam source (10), and a surface of the target medium or a surface capable of reflecting the acoustic wave (20). The target may be a readily available material whose thermodynamic properties are well-known and understood. An example of a target (13) may be liquid water at a temperature at or near ambient room temperature. The pump beam (11) may be a Q-switched laser beam focused to cause an acoustic wave (12) of sufficient amplitude that the probe beam (15) may be disturbed and the probe beam detector (16) may easily and readily detect the passage of the acoustic wave (12). The probe beam (15) may either be one or two or more laser beams. Whether one or two or more beams are used is indicative of the actual method used to determine the velocity of the acoustic wave (12) within the target media (13). For example, one probe beam (15) may be used if the distance is known from the disturbance causing the acoustic wave generation to the probe beam axis passing through the target media; therein, only the time required for the acoustic wave (12) to reach the axis of the probe beam may need to be measured. As another example, the single beam technique may be used by counting an initial detection of the acoustic wave by the probe beam as time zero, then measuring the time from time zero until the acoustic wave travels back to the probe beam (15) after being reflect off of surface (20), wherein the surface (20) is located at a known distance from the probe beam (15). If a two or more probe beam setup is utilized, the principle in measuring the period of time the acoustic wave (12) propagates through the target medium (13) can simply be the time that the acoustic wave (12) travels through a known distance between each probe beam.

Figure 2:
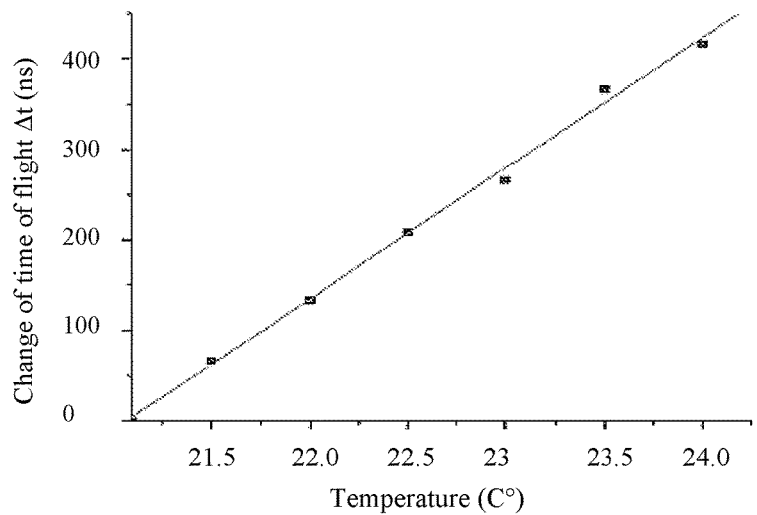
FIG. 2. Demonstrates the change of speed of an acoustic wave in a target medium as temperature of the target medium changes, which causes a change in how long it takes the acoustic wave to reach the probe beam (change in time of flight).

FIG. 2 shows how a change in temperature of a target medium can change the speed of an acoustic wave in a target medium and therefore the time that the acoustic wave reaches a probe beam. FIG. 2 also shows that a known speed and/or change of speed of an acoustic wave in a target medium may be used to determine the temperature of the target medium.

This proposed method of measuring the energy absorbed by a target media offers a potential standard method of determining the energy emitted by an electromagnetic energy source whose wavelength is known, but whose power of emission is unknown. Furthermore, the apparatus and methods described herein provide a means of calibrating Narda probes used to measure the field strength of RF sources.

Optical sensors based on probe beam deflection technique (PBDT) are an accurate non-contact and non-destructive method of sensing acoustic wave and related phenomena. These optical sensors are insensitive to background noise, minimizing the need for acoustic isolation or shielding. Such optical probes have high axial resolution that allows the use multi of optic probes next to each other.

In the case of the PBDT method, a pressure wave is detected indirectly, as it propagates through the detection chamber or medium and interacts with the probe beam. The propagation of this pressure wave produces a local density gradient, which alters the refractive index of the medium, leading to beam deflection. When the front of the acoustic wave passes through the probe beam it causes an increase in the media refractive index, which consequently deflects the probe beam towards the higher density region, forming the "negative lobe" of the signal. During the trailing edge of the wave the probe beam bends in the opposite direction producing the "positive lobe" due to the decreasing density gradient. Subsequently the beam returns to its initial position as the wave propagates beyond the interaction region.

The invention claimed is:

1. A method for measuring the speed of an acoustic wave comprising:
   (i) exposing a target medium having at least one probe beam traveling through the target medium to an excitation source to generate an acoustic wave;
   (ii) detecting at least one probe beam deflection of the at least one probe beam traveling through the target medium;
   (iii) calculating acoustic wave speed using information provided by detection of at least one probe beam deflection;
   (iv) exposing the target medium to an electromagnetic energy that is absorbed by the target medium; and
   (v) repeating steps (i) to (iv) and calculating the change in acoustic speed of the target medium when exposed to electromagnetic energy.

2. A method for measuring electromagnetic energy deposition in a target medium or temperature of a target medium comprising:
   exposing a target medium having at least one probe beam traveling through the target medium to an excitation source to generate an acoustic wave;
   detecting at least one probe beam deflection of the at least one probe beam traveling through the target medium;
   calculating speed of the acoustic wave using information provided by detection of at least one probe beam deflection;
   exposing the target medium to an electromagnetic energy that is absorbed by the target medium;
   exposing the target medium having at least one probe beam traveling through the target medium to an excitation source to generate a second acoustic wave;
   detecting at least one probe beam deflection of the at least one probe beam traveling through the target medium;
   calculating speed of the second acoustic wave using information provided by detection of at least one probe beam deflection; and
   determining the electromagnetic energy deposition in the target medium or the temperature of the target medium using a change in speed of the acoustic wave as compared to the second acoustic wave before and after exposure to the electromagnetic energy.

* * * * *